(12) United States Patent
Guyan et al.

(10) Patent No.: US 8,905,558 B2
(45) Date of Patent: Dec. 9, 2014

(54) OPTICAL TRACKING MARKER MOUNTING APPARATUS

(75) Inventors: Alan Guyan, Baltimore, MD (US); Elizabeth Ann Henningsgaard, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 239 days.

(21) Appl. No.: 13/218,092

(22) Filed: Aug. 25, 2011

(65) Prior Publication Data

US 2013/0050826 A1 Feb. 28, 2013

(51) Int. Cl.
*G02B 5/12* (2006.01)
*G06F 3/00* (2006.01)
*G06F 3/03* (2006.01)
*G06F 3/01* (2006.01)

(52) U.S. Cl.
CPC .............. *G06F 3/005* (2013.01); *G06F 3/0308* (2013.01); *G06F 3/017* (2013.01); *G06F 3/0325* (2013.01)
USPC ....................................................... 359/518

(58) Field of Classification Search
CPC .... G02B 5/136; G02B 27/017; G02B 5/0221; G02B 5/132; G02B 5/286; G06F 3/005; G06F 3/017; G06F 3/0308; G06F 3/0325; G06T 5/00
USPC ........... 359/518, 497, 502; 345/475, 419, 473
See application file for complete search history.

(56) References Cited

U.S. PATENT DOCUMENTS

| 4,517,685 | A | 5/1985 | Lesley | |
|---|---|---|---|---|
| 7,633,521 | B2 | 12/2009 | Perlman et al. | |
| 2007/0073137 | A1* | 3/2007 | Schoenefeld | 600/407 |
| 2009/0023122 | A1* | 1/2009 | Lieberman et al. | 434/258 |
| 2010/0312160 | A1* | 12/2010 | Creighton et al. | 602/62 |

* cited by examiner

*Primary Examiner* — William Choi
*Assistant Examiner* — Sharrief Broome
(74) *Attorney, Agent, or Firm* — Maginot Moore & Beck LLP

(57) ABSTRACT

An arrangement comprises a garment, a mounting apparatus and an optical tracking marker to be used in motion capture. The arrangement may include a plurality of mounting apparatuses and optical tracking markers. The garment includes openings. The mounting apparatus includes legs which are shaped and include features to enable the mounting apparatus to engage the openings of the garment. The mounting apparatus further includes a marker coupling which is shaped and includes features to engage the optical tracking marker. The mounting apparatus provides a secure yet removable attachment for the optical tracking marker to the garment.

19 Claims, 5 Drawing Sheets

OPTICAL TRACKING MARKER MOUNTING APPARATUS

FIELD

This application relates to the field of optical tracking markers and specifically to attaching optical tracking markers to subjects for recording movement with a motion capture system.

BACKGROUND

Optical tracking markers may be used with cameras in a motion capture system to track and analyze the movement of a subject. This technology has been used to study biomechanics and physical capabilities of human and animal subjects in physical therapy and performance assessments. The technology has also been used in animation to achieve more lifelike and natural poses and movements for products like movies and video games.

For use in a motion capture system, optical tracking markers, which are often, for example, polystyrene spheres, are placed on a subject at particular locations which will best indicate how the subject is moving and the relationships between markers of particular interest. The optical tracking markers are coated with a retro-reflective material which enhances the amount of light reflected back from the surfaces of the markers. The cameras, which are often infrared cameras, for example, are calibrated to record only light with a certain threshold of brightness. The cameras then record only the markers because of the enhanced reflection of light from their surfaces relative to other surfaces in the recorded field. The recorded positions of the markers can then be used as a frame and can either be analyzed to assess biomechanics and physical capabilities or can be modified and animated to create realistic animation based on natural movements.

For the optical tracking markers to accurately indicate the movement and relationships of particular locations on the subject's body, it is important that they are properly and securely affixed to the subject. If the marker is loose, the recorded movement will include artifacts of the marker bouncing and moving separately from the subject. Known methods of affixing the markers to the subject include attaching the marker directly to the subject, removably attaching the marker to an article of clothing that the subject wears or permanently integrating the marker into an article of clothing that the subject wears. Each method of attaching markers to the subject creates specific challenges and disadvantages.

Markers that are attached directly to the subject must be affixed firmly enough to eliminate unwanted movement, but must also be easily and painlessly removed from the subject's body following the data collection. Double sided tape and medical tape are normally used to attach markers directly to the subject. In order for the markers to be successfully attached to the subject, the double sided or medical tape must be sufficiently sticky and must be able to maintain stickiness while the subject is in motion for the duration of the data collection. If the tape is too sticky, however, it may be difficult or painful to remove the markers from the subject. Additionally, a subject's skin may be irritated or react allergically to the adhesive in the tape. It is desirable to attach the markers to the subjects in a way that will overcome the challenges presented by using double sided or medical tape to attach markers directly to the skin of subjects.

Markers that are permanently integrated into clothing that the subject wears are firmly affixed to the article, but the article of clothing must also closely adhere to the subject. The article must fit the subject so that the markers align with the proper locations on the subject's body to record the desired movements and inter-body relationships. Markers that are permanently integrated into the article of clothing that the subject wears are often sewn on, woven in or snapped on to the material. If the article is too large for the subject, it will fit loosely and unwanted movements of the markers will be recorded. If the article is too small for the subject, the markers may not line up with the appropriate points on the subject's body. It is desirable to attach the markers to the subjects in a way that will overcome the challenges presented by markers that are sewn, woven or snapped on.

Markers that are removably attached to clothing that the subject wears must be affixed firmly to the article of clothing and the article of clothing must closely adhere to the subject in order to avoid unwanted movement of the marker. These markers must also be easily removed without damaging the subject's clothing. Hook and loop fasteners, double sided tape and adjustable straps are normally used to attach markers to an article of clothing that the subject wears. Limitations of attaching markers to clothing are two-fold. The hook and loop fastener, double sided tape or adjustable strap must be affixed firmly to the subject's clothing to avoid recording unwanted movement artifacts that result from the marker moving on the clothing. Concurrently, the subject's clothing must closely adhere to the subject to avoid recording unwanted movement artifacts that result from the clothing moving on the subject. It is desirable to attach the markers to the subjects in a way that will overcome the challenges presented by markers that are affixed to clothing that the subject wears with hook and loop fasteners, double sided tape and adjustable straps.

In view of the foregoing, it would be desirable to provide an improved marker attachment. Because the data recorded by a motion capture system are used for very detailed analyses of subtle differences and fine movements, the precision and accuracy of the marker movements are of utmost importance. It is desirable then that the improved marker attachment provides a quick and simple way to attach markers to subjects that addresses both properly positioning the markers on the subjects and firmly affixing the markers in those positions.

SUMMARY

In accordance with one embodiment of the disclosure, there is provided an optical tracking arrangement for a body, the arrangement including a garment including a plurality of openings, a plurality of mounts releasably secured to the garment, each of the plurality of mounts including at least one leg engaging one of the plurality of openings in the garment, and a plurality of optical tracking markers positioned on the plurality of mounts.

Various embodiments of the optical tracking arrangement are possible. For example, the garment may be comprised of a compression fabric. Additionally, each of the plurality of mounts may include a plurality of legs and each of the plurality of legs may include a barb. In accordance with another embodiment of the disclosure, each of the plurality of legs may be arcuate in shape. Additionally, there may exist a spacing defined between tips of the legs that is substantially the same as a spacing defined between the openings in the garment.

Pursuant to yet another embodiment of the disclosure, the body portion may be a central body portion having a substantially cylindrical shape, and each of the plurality of legs may extend radially and axially away from the central body portion. Additionally, the marker coupling may comprise a post extending from the central body portion in an axial direction.

In accordance with another embodiment of the disclosure, a method of mounting an optical tracking marker on a body is provided. The method comprises donning a garment comprising a plurality of openings, positioning a plurality of mounts to the garment by inserting legs on the plurality of mounts into the plurality of openings in the garment, and positioning a plurality of optical tracking markers on the plurality of mounts. In at least one alternative embodiment, the plurality of optical tracking markers is positioned on the plurality of mounts before the plurality of mounts is positioned on the garment. Additionally, the garment is donned after the plurality of mounts is positioned on the garment. In at least one alternative embodiment, positioning the plurality of mounts to the garment may include inserting tips of the legs into the openings of the garment and rotating the mounts such that the legs more fully engage the openings in the garment. Pursuant to yet another embodiment of the disclosure, positioning the plurality of optical tracking markers on the plurality of mounts may include inserting a post on each of the plurality of mounts into a cavity on each of the plurality of optical tracking markers.

The above described features and advantages, as well as others, will become more readily apparent to those of ordinary skill in the art by reference to the following detailed description and accompanying drawings. While it would be desirable to provide a mounting apparatus that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
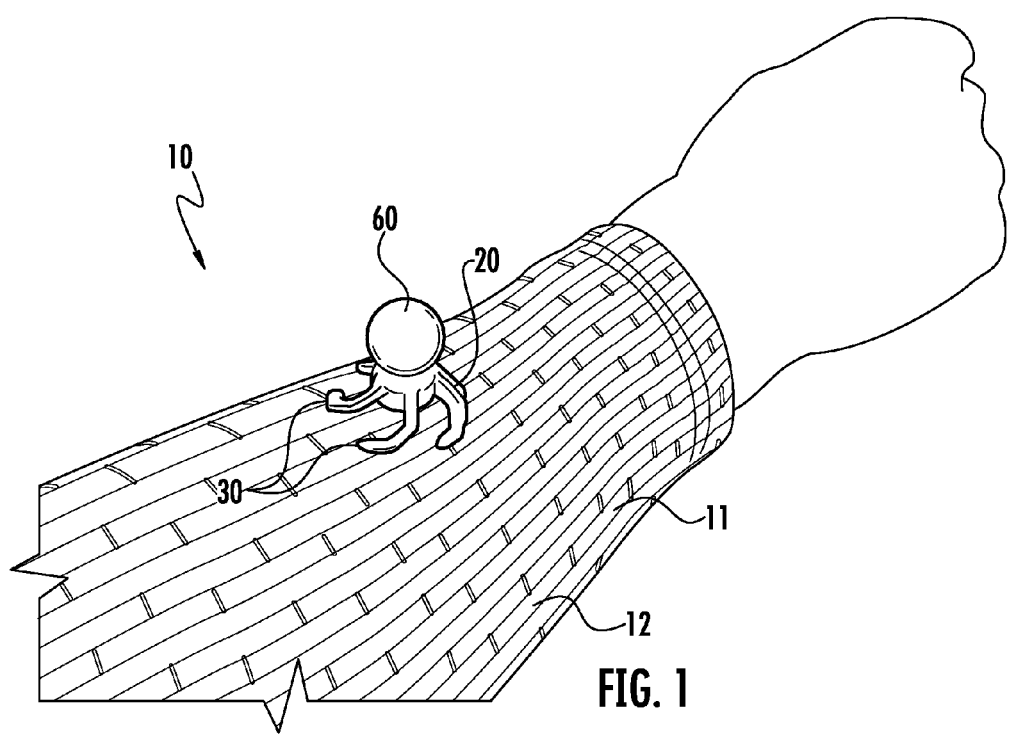
FIG. 1 shows a perspective view of an optical tracking arrangement including a marker mounting apparatus affixed to a garment worn by a subject.

FIG. 1 shows an optical tracking arrangement 10 including a garment 11, a mount in the form of mounting apparatus 20 and an optical tracking marker 60. Although only one is shown in FIG. 1, an optical tracking arrangement 10 may include a plurality of mounting apparatuses 20 and tracking markers 60. The garment 11 is worn by the subject and engages the mounting apparatus 20 by retaining the legs 30 of the mounting apparatus 20 within openings 12 provided in the garment 11. The mounting apparatus 20 is configured to retain an optical tracking marker 60, such that movements of the subject may be monitored. After use, the mounting apparatus 20 may be easily removed from the garment 11 as explained in further detail below. As shown more clearly in FIGS. 2-5, the mounting apparatus 20 includes a body 40, a marker coupling 50 extending upwardly from the body 40 and legs 30 extending outwardly from the body 40. The marker coupling 50 secures an optical tracking marker 60 which can be tracked and recorded by a motion capture system.

The garment 11 is generally provided as a fabric comprising a plurality of openings 12. In at least one embodiment, the fabric is a compression fabric comprised at least in part of elastane or synthetic fiber material that stretches to accommodate the wearer. However, the fabric can be any close fitting, stretch material which rests firmly on the body. In the embodiment of FIG. 1, the garment 11 provided is a mesh article. The garment 11 may be loosely woven to include openings 12 integrated throughout the garment 11. Alternatively, the garment 11 may include raised loops (not shown) that extend beyond the surface of the garment 11 to create openings 12 above the garment. Each of these embodiments provides openings 12 on the garment 11 to engage the legs 30 of a mounting apparatus 20 as shown in FIG. 1.

In the embodiment of FIG. 1, the garment 11 is a shirt configured to be worn by a human. In other embodiments, the garment 11 may be a vest, a sock, a sleeve, a cuff or any other wearable article. Additionally, the garment 11 may be configured to be worn by a horse, a dog or any other animal for which optical motion capture is desired.

The mounting apparatus 20 includes a body 40, a marker coupling 50 and legs 30. The mounting apparatus 20 may be made of some hard plastic or polymer substance formed as a single molded piece. Thus, the marker coupling 50 and legs 30 are extensions off of the body 40 of the mounting apparatus 20 and are made of the same material. In other embodiments, the marker coupling 50, legs 30 and body 40 may be formed of different materials that are combined to form the mounting apparatus 20. The body 40 can be of varied shapes and thicknesses sufficient to support the marker coupling 50 and the legs 30 extending away from the body 40. The body 40 may also be in the form of a central body portion.

Figure 2:
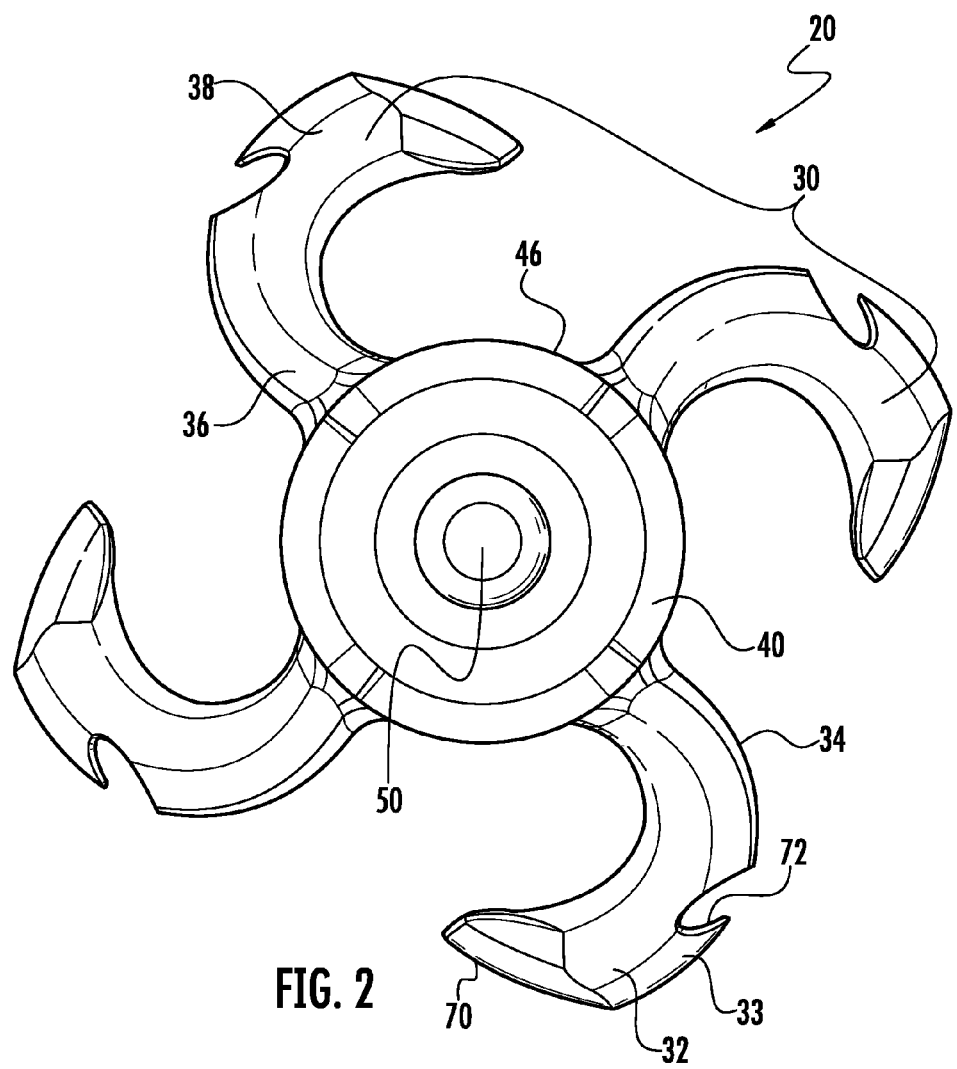
FIG. 2 shows a top view of an optical tracking marker mounting apparatus with a spiral configuration.
Figure 3:
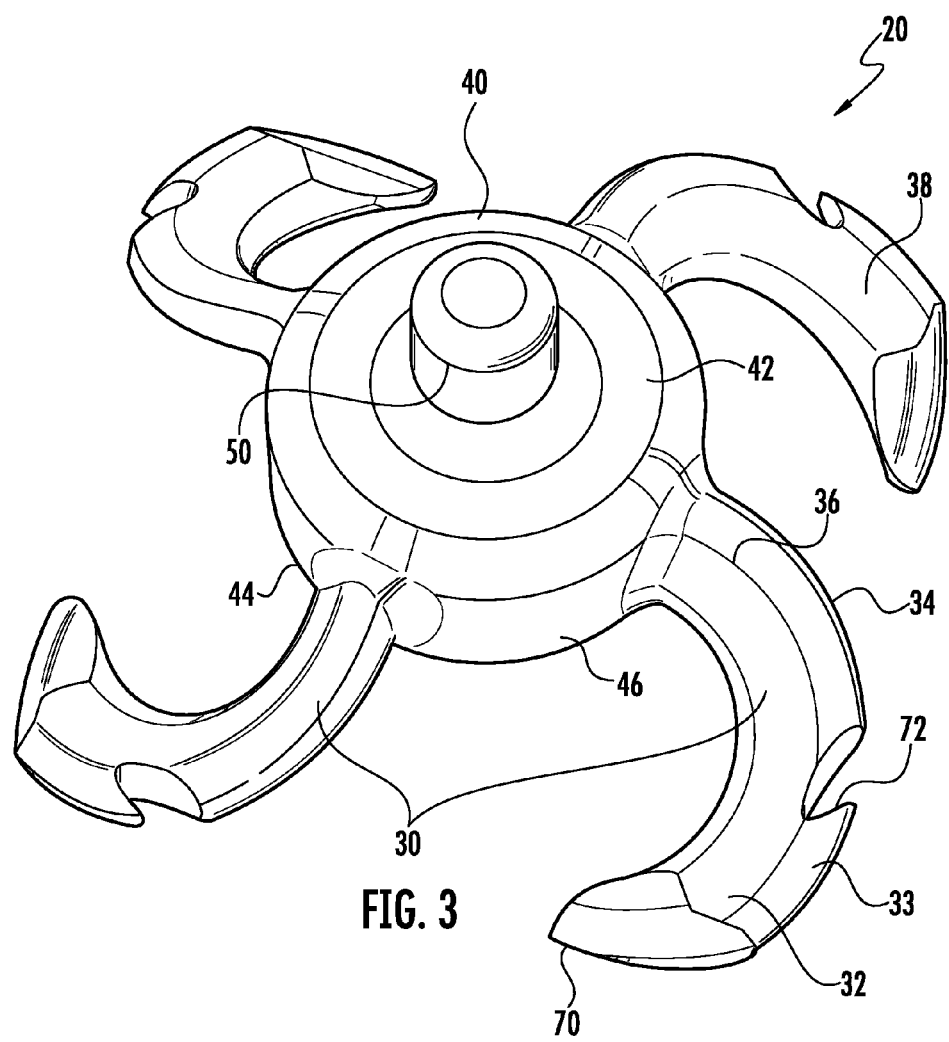
FIG. 3 shows a perspective view of the mounting apparatus of FIG. 2.

With particular reference to FIGS. 2 and 3, the body 40 includes a top surface 42, a bottom surface 44 and a side surface 46. The marker coupling 50 extends from the center of the body 40 on the top surface 42. The marker coupling 50 is configured to engage a marker 60 (shown in FIG. 1), and particularly an optical tracking marker, in such a way that the marker 60 is removably attached to the mounting apparatus 20. In the embodiment shown, the marker coupling 50 is in the form of a post. Alternatively, the marker coupling 50 may be in any form which releasably engages the marker 60 on the mounting apparatus 20. The marker coupling 50 may include, for example, a snap fit or a threaded feature (not shown) to engage a complementary feature (not shown) on the marker 60 to provide a secure but temporary attachment.

The legs 30 extend from the body 40 to provide a removable attachment between the garment 11 (shown in FIG. 1) and the mounting apparatus 20. The spacing of the legs 30 corresponds to a spacing between the openings 12 on the garment 11, so that the legs 30 are easily received and retained on the garment 11. The legs 30 may be of the same material as the body 40 and each includes a top 32, a bottom 34 and a side 33. Each leg 30 also includes a base region 36 which extends from the body 40 and forms the portion of the leg 30 nearest to the body 40. Each leg 30 also includes an end region 38 which extends from the base region 36 and forms the portion of the leg 30 farthest from the body 40. Each leg 30 also includes a tip 70 at each end region 38. The tips 70 may be pointed at varying degrees and are configured to pass through the openings 12 in the garment 11.

Figure 4:
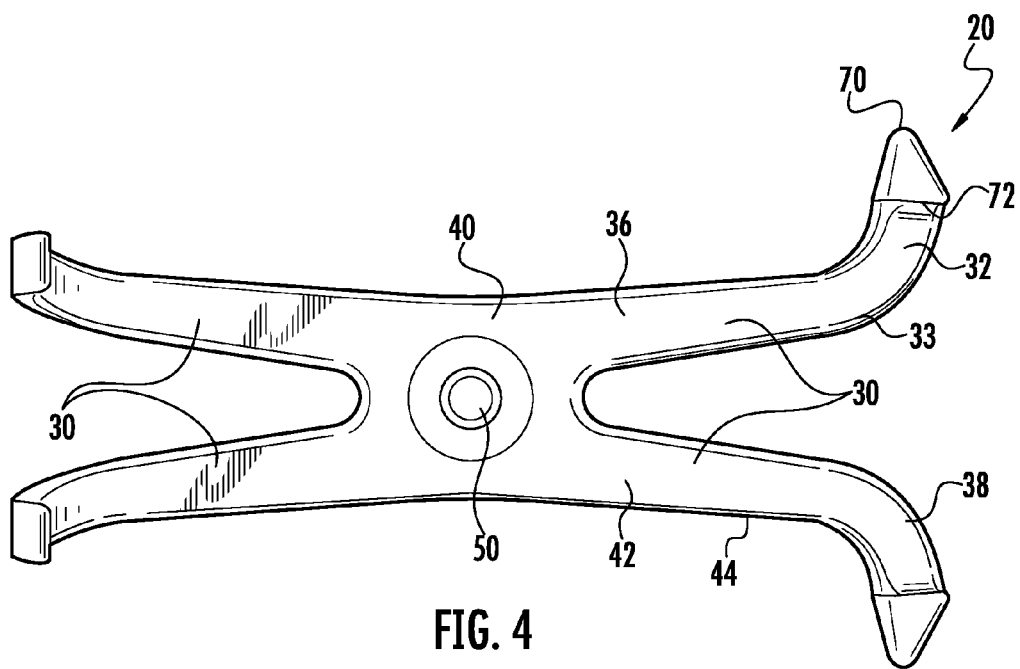
FIG. 4 shows a top view of an optical tracking marker mounting apparatus with an elongated configuration.
Figure 5:
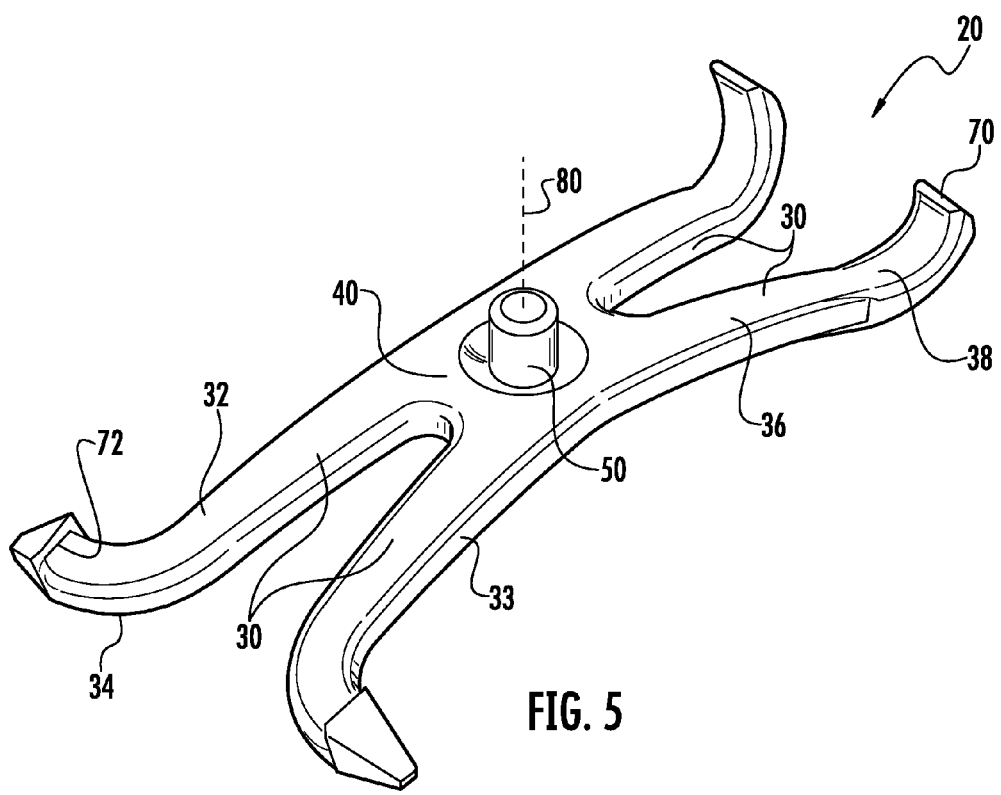
FIG. 5 shows a perspective view of the mounting apparatus of FIG. 4.

As shown in FIGS. 2-5, each leg 30 may include a barb hook 72 which is configured to retain the leg 30 on the garment 11 (shown in FIG. 1) until intentionally disengaged. Put another way, the barb hooks 72 are configured to prevent the tips 70 from being unengaged and removed from the openings 12 in the garment 11 unintentionally. The barb hooks 72 may be positioned on the legs 30 closer to the body 40 of the mounting apparatus 20 than the tips 70 and may be directly adjacent to the tips 70 or may be at a distance from the tips 70. The barb hooks 72 may be formed on the side 33 (as shown in FIGS. 2-3) or the top 32 (as shown in FIGS. 4-5) of the leg 30. Each leg 30 need not include a barb hook 72. A leg 30 that does not include a barb hook 72 may remain engaged with the garment 11 by its relation to other legs 30 that do include barb hooks 72 or by the shape of the leg 30 and the tip 70.

The legs 30 may be arranged on the body 40 in a variety of configurations including a spiral configuration and an elongated configuration. In the spiral configuration (shown in FIGS. 2-3), the base regions 36 of the legs 30 extend from the side surface 46 of the body 40 of the mounting apparatus 20 and curve around the body 40. These legs 30 are generally arcuate in shape and may angle downwardly and descend outwardly (from a position closer to the top surface 42 to a position closer to the bottom surface 44) as they curve around the body 40 so that the end regions 38 are lower than the base regions 36. In other words, the legs 30 may extend both radially and axially away from the body 40.

The spiral configuration may include a plurality of legs 30 spaced radially around the body 40. The spiral configuration may be used to removably attach the mounting apparatus 20 to the garment 11 (shown in FIG. 1) by pressing the body 40 onto the garment 11 while also twisting the body 40 in the direction that the legs 30 curve. The tips 70 of the legs 30 will then pass through the openings 12 in the garment 11 and be retained by the barb hooks 72.

Alternatively, in the elongated configuration (shown in FIGS. 4-5), the base regions 36 of the legs 30 extend from the body 40 as continuations of the top surface 42. The base regions 36 extend in a substantially linear fashion from the body 40 while the end regions 38 curve so that the legs 30 are not entirely flat. Thus, the legs 30 may be slightly arcuate in shape. For example, the end region 38 of the leg 30 may be below a plane created by the bottom surface 44 of the body 40. In other words, the legs 30 may descend outwardly from the body 40.

The elongated configuration includes a plurality of legs 30 that may all be identical or may be in matching subsets. For example, as shown in FIG. 4-5, the end regions 38 of two of the legs 30 may curve radially away from the body 40 (e.g., radially outward from an axis 80 defined by the marker coupling 50) while the end regions 38 of the other two legs 30 may curve axially away from the body 40 (e.g., in a direction substantially parallel to the axis 80 defined by the marker coupling 50). In other words, the legs 30 extend from the body 40 in both a radial direction and an axial direction. Furthermore, the end regions 38 of two of the legs 30 may include tips 70 and barb hooks 72 while the end regions 38 of the other two legs 30 may contain no barb hooks 72 and simply taper to a point at the tips 70.

The elongated configuration may be used to removably attach the mounting apparatus 20 to the garment 11 (shown in FIG. 1) by pressing the body 40 onto the garment 11 so that two of the legs 30 will pass through the openings 12 and shifting it along the garment 11 so that the remaining two legs 30 may also pass through openings 12 before releasing the body 40 so that all four legs 30 will be engaged with openings 12 in the garment 11 and be retained by the barb hooks 72.

The optical tracking marker 60 is generally provided as a small, detectable member. In the embodiment shown, the marker 60 is in the form of a passive, retro-reflective sphere. This marker 60 may consist of a Styrofoam sphere that is coated with a retro-reflective layer, for example. This marker 60 is detected and tracked by reflecting light more effectively than other surfaces in the measured area. In an alternative embodiment, the marker 60 may be an active, light emitting diode (LED). A LED is detected and tracked by emitting its own light rather than by reflecting an externally emitted light. Alternatively, the optical tracking marker 60 may be any small, detectable member which can be affixed to a mounting apparatus 20.

In operation, the optical tracking arrangement 1 may be positioned on an athlete or other subject to facilitate tracking of the subject's movements. To position the optical tracking arrangement 1 on the subject, the subject first dons the garment 11. Next, the plurality of mounting apparatuses 20 are positioned on the garment 11 by inserting the legs 30 of each of the plurality of mounting apparatuses 20 into the openings 12 of the garment 11. Finally, the optical tracking markers 60 are positioned on the plurality of mounting apparatuses 20. Each mounting apparatus 20 provides a secure yet removable attachment for a marker 60 to a garment 11. The body 40 of the mounting apparatus 20 retains a marker 60 on the marker coupling 50 while the legs 30, including tips 70 and barb hooks 72, secure the body 40 to the garment 11. The legs 30 easily engage openings 12 in the garment 11 because the garment 11 is a stretchy and flexible material and the legs include tips 70 which easily pass through the openings 12. The legs 30 are prevented from becoming unintentionally unengaged from the garment 11 because the barb hooks 72 located on the end regions 38 retain the openings 12 on the legs 30. However, the legs 30 can be intentionally unengaged from the garment 11 by manipulating the mounting apparatus 20 and the garment 11 to avoid further engaging the barb hooks 72.

It will be appreciated that while in one embodiment of the disclosure, the marker 60 is affixed to the marker coupling 50 on the mounting apparatus 20 before the mounting apparatus 20 is attached to the garment 11, in an alternative embodiment, the mounting apparatus 20 may be attached to the garment 11 before the marker 60 is affixed to the marker coupling 50 on the mounting apparatus 20. Similarly, in one embodiment, the mounting apparatuses 20 may be attached to the garment 11 before the garment 11 is donned by the subject. In an alternative embodiment, the garment 11 may be donned by the subject before the mounting apparatuses 20 are attached to the garment 11.

The foregoing detailed description of one or more embodiments of the optical tracking marker mounting apparatus has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An optical tracking arrangement for a body comprising:
a garment comprising a plurality of openings with a first spacing between each of the plurality of openings;

a plurality of mounts releasably secured to the garment, each of the plurality of mounts including a plurality of legs, each of the plurality of legs engaging one of the plurality of openings in the garment with the leg extending through the opening, wherein a second spacing between tips of the plurality of legs is substantially the same as the first spacing between each of the plurality openings, each of the plurality of openings designed and dimensioned to receive one of the plurality of legs; and a plurality of optical tracking markers positioned on the plurality of mounts.

2. The optical tracking arrangement of claim 1 wherein the garment is comprised of a compression fabric.

3. The optical tracking arrangement of claim 1 wherein each of the plurality of legs includes a barb.

4. The optical tracking arrangement of claim 1 wherein each of the plurality of legs is arcuate in shape.

5. The optical tracking arrangement of claim 1 wherein each of the plurality of legs descends outwardly from a central body portion.

6. The optical tracking arrangement of claim 5 wherein each of the plurality of mounts further includes a marker coupling positioned on the central body portion.

7. The optical tracking arrangement of claim 6 wherein the marker coupling comprises a post extending from the central body portion.

8. The optical tracking arrangement of claim 1 wherein the plurality of optical tracking markers are comprised of a retroreflective material.

9. A device for retaining an optical tracking marker, the device comprising:
   a body portion including a central top surface;
   a marker coupling positioned on the central top surface of the body portion and configured to couple the optical tracking marker to the body portion; and
   a plurality of legs extending outward from the body portion, the plurality of legs void of optical tracking markers and void of marker couplings configured to couple optical tracking markers to the legs, and each of the plurality of legs substantially arcuate in shape.

10. The device of claim 9 wherein each of the plurality of legs includes a barb.

11. The device of claim 10 wherein the body portion is a central body portion having a substantially cylindrical shape, and wherein each of the plurality of legs extends radially and axially away from the central body portion.

12. The optical tracking arrangement of claim 11 wherein the marker coupling comprises a post extending from the central body portion in an axial direction.

13. A method of mounting an optical tracking marker on a body, the method comprising:
   donning a garment comprising a plurality of openings with a spacing between each of the plurality of openings;
   positioning a plurality of mounts to the garment by inserting legs on each of the plurality of mounts into the plurality of openings in the garment with each of the plurality of openings designed and dimensioned to receive one of the legs, each leg extending through one of the plurality of openings, and a spacing between tips of the plurality of legs substantially the same as the spacing between each of the plurality openings; and
   positioning a plurality of optical tracking markers on the plurality of mounts.

14. The method of claim 13 wherein the plurality of optical tracking markers are positioned on the plurality of mounts before the plurality of mounts are positioned on the garment.

15. The method of claim 13 wherein the garment is donned after the plurality of mounts are positioned on the garment.

16. The method of claim 13 wherein the legs include arcuate portions and wherein positioning the plurality of mounts to the garment includes inserting tips of the legs into the openings of the garment and rotating the mounts such that the legs more fully engage the openings in the garment.

17. The method of claim 13 wherein positioning the plurality of optical tracking markers on the plurality of mounts includes inserting a post on each of the plurality of mounts into a cavity on each of the plurality of optical tracking markers.

18. The optical tracking arrangement of claim 1 wherein the diameter of each of the plurality of openings is substantially larger than a distance between garment fibers in areas of the garment removed from the openings.

19. The optical tracking arrangement of claim 1 wherein the openings are spread out over a substantial entirety of the garment.

* * * * *